2,854,448
METHOD FOR THE PREPARATION OF COLD-WATER-SOLUBLE FORMS OF CELLULOSE ETHERS

Arthur W. Anderson, Bernhard V. Moeller, and Merrill H. Weymouth, Midland, Mich., assignors to The Dow Chemical Company, Midland, Mich., a corporation of Delaware No Drawing. Application March 19, 1956
Serial No. 572,209

9 Claims. (Cl. 260—232)

This invention relates to an improved method for the preparation of granular, cold-water-soluble forms of cellulose ethers.

Several of the ether derivatives of cellulose may be generally characterized as being insoluble in hot water and soluble in cold water. The methyl, certain of the ethyl, and the hydroxypropyl methyl ethers of cellulose are commonly included, among others, in this class of derivatives. Cellulose ether derivatives of this nature are usually manufactured in a relatively fibrous form. In such form they ordinarily may require pretreatment with hot water for periods as long as half-an-hour to facilitate obtaining their satisfactory dispersion or solution in cold water. Various techniques have been devised for avoiding or eliminating this requirement so that cellulose ethers which are directly and readily soluble in cold water might be available. It would be advantageous to provide an improved and more facile method for the preparation of granular forms of cellulose ethers that are directly soluble in cold water.

This desideratum and other benefits and advantages may be realized by a method in accordance with the present invention which comprises forming a viscous, aqueous solution of a cold-water-soluble cellulose ether containing between about 2 and 35 percent by weight of the ether; gelling the solution in strandular form in a hot aqueous bath maintained at a temperature above the syneresis point of the ether; then, while said ether is being maintained at a temperature above its syneresis point, sequentially rupturing the strandular surface of the gelled cellulose ether and dewatering and drying said ruptured strands; and, finally, comminuting the dried cellulose ether to a granular form. Advantageously, the dissolved cellulose ether is gelled and subsequently treated until dried while it is being maintained at a temperature which is in the neighborhood of 20–30 centigrade degrees above its syneresis point. The products which are obtainable by practice of the invention are granular or powder forms of cellulose ethers having uniform and high bulk densities and excellent dispersability directly in cold water without further necessity for hot water pretreatment.

The aqueous cellulose ether solutions which are employed in the practice of the present invention may be prepared or obtained in any desired manner. For example, commercially available cellulose ethers in fibrous form may be dissolved according to the conventional technique which utilizes pretreatment with hot water. Or, more advantageously, the solutions may be obtained from a freshly prepared cellulose ether which has been purified while being slurried with hot water to extract water soluble materials therefrom. Or, if desired, an equivalent hot aqueous slurry may be prepared with a commercially obtained fibrous product.

By way of convenient illustration, methyl cellulose, after its formation, is generally purified in water at a temperature of at least about 50° C. in the form of a slurry containing from about 1 to 5 percent by weight of the ether. More advantageously, a more uniformly dispersed mass is achieved when the slurry is maintained at a temperature in excess of about 70° C. If desired, superatmospheric pressure may be utilized with the hot, aqueous slurry. Such a slurry may be filtered or pressed to remove excess water until a desired ratio of the cellulose ether to water is obtained. After this, a solution may be obtained by cooling the mass to a dissolving temperature below its gel point. For methyl cellulose ethers, a temperature in the neighborhood of 15–20° C. may advantageously be utilized for dissolution. In many instances, especially with higher viscosity types of ethers, stirring of the cooling or cooled mass may facilitate its dissolution. With methyl cellulose, as with other cellulose ether derivatives, the cooling should be performed in such a manner as will avoid dehydration of the gel.

The dissolution of a cellulose ether is usually visually discernible. According to conventional concepts, the fibrous cellulose ether is considered to be completely dissolved after a clear and transparent mass has formed. In some instances, however, air may be entrained or entrapped in a dissolved mass to cause its somewhat translucent appearance. This may occur, for example, after the more vigorous stirring which may frequently be employed to hasten the dissolution of a more difficultly soluble ether, such as one having a high viscosity rating.

The dissolved concentration of the cellulose ether in water may sometimes be further limited by the viscosity characteristics of the particular ether that is involved, according to its viscosity in a 2 percent aqueous solution at 20° C. Thus, as will be apparent to those skilled in the art, the upper aqueous solution concentrations may not be practical or may even be impossible to prepare or attain with certain higher viscosity types of cellulose ethers. It is generally beneficial, when possible, to employ aqueous solutions that contain between about 5 and 25 percent by weight of the dissolved ether.

The aqueous cellulose ether solution may be heat gelled in strandular form in any desired manner. It is usually expedient to express it into the hot water for strandular or strand-like gellation from a screw type extruder or an equivalent apparatus. Frequently, when such an apparatus is employed, it is possible to form the aqueous solution of the ether just prior to the extrusion step by cooling to a dissolving temperature within the extruder a suitable ether slurry which has been admitted to the extruder at an elevated temperature. Such a technique also secures the benefit of agitation for the dissolving mass within the extruder.

The syneresis point of a cellulose ether usually varies with particular types of ethers and with particular conditions of gellation. It is recognized, for example, that if the temperature of a methyl cellulose solution is raised slowly to the gel point the formation of the gel takes place over a range of temperature rather than suddenly, and the point at which syneresis occurs is approximately 10 to 20° C. higher than the temperature range in which the gel forms. By way of illustration, if the gel point ranges from about 45° C. to 50° C. the point at which syneresis occurs may be from about 55° C. to 70° C. Materials which gel at a lower temperature generally synerize at a lower temperature. And, as indicated, the temperature range may be more narrow when quick gellation is involved.

Generally, it is preferable to extrude the viscous solution in the form of ribbons or rods which advantageously may be cut or chopped into short, discontinuous lengths or "noodles" upon extrusion and prior to contacting the hot aqueous bath. This procedure facilitates handling and immersing the chopped strands in the hot bath and permits a better heat exchange to maintain the strandularly heat-gelled ether at a temperature above its syneresis point. It is desirable for the maximum cross-sectional dimension of the strands of heat-gelled ether to be less than about ⅜ inch. It is usually beneficial for the chopped strands to have a relatively short length as, for example, one or two inches or so, although there is usually no precise criticality involved in this.

In order to permit the heat gelled strands of the ether to be dewatered prior to drying, it is necessary to rupture their surface. Unless this is done it is usually impossible to extract more than about 10 or 15 percent by weight of the water by mechanical dewatering processes. A suitably ruptured strand, however, may readily be mechanically dewatered to a gelled form of the ether having a water content in the neighborhood of 65–70 percent by weight or less. The rupturing may be easily accomplished by a grinding operation upon the gelled strands using a knife mill or equivalent device until the surface of the strands has been broken. As mentioned, the temperature of the gelled strands must be maintained above the syneresis point of the ether during the rupturing operation. Advantageously, it is maintained at a temperature well in excess of its syneresis temperature during this step as at a temperature that is 20–30 centigrade degrees thereabove. If desired, the strands may be removed from the hot aqueous gelling bath for the rupturing operation. However, the rupturing may also be accomplished readily, especially when the present invention is being practiced in the manner of a continuous process, by permitting the gelled strands of the ether to remain in the hot aqueous bath that is employed for their gellation while conveying them through the rupturing apparatus in a moving stream or current of the bath.

After being ruptured, the gelled strands may be dewatered in a press or with a centrifuge or by other suitable means, being careful that the temperature of the mass does not fall beneath the syneresis point of the cellulose ether. The dewatered strands may then be dried in a conventional manner and with commonly employed apparatus while being maintained at a temperature above the syneresis point. It is important to avoid redissolution of the cellulose ether during the drying. This may be accomplished by maintaining the temperature of the mass in the indicated range. The best results may be obtained when the maximum amount of water that is removable is taken out of the ruptured strands prior to drying the cellulose ether.

The dried cellulose ether product may then be reduced to the desired particle size by grinding or by comminution in accordance with other suitable techniques.

The invention is further illustrated in and by the following examples.

Example 1

An 8 percent by weight aqueous slurry of methyl cellulose, having a viscosity of about 400 centipoises in a 2 percent aqueous solution at 20° C. was admitted at a temperature of about 45° C. to a conventional 2 inch screw type extruder and cooled therein to a temperature of about 20° C. to form a viscous aqueous solution having a dough like consistency. Using a multiple orifice die and operating the extruder at a rate of about 6 pounds per hour, the solution was extruded into about ¼ inch rods which were chopped into 2 inch "noodles" before being immersed for heat gellation in a moving water bath maintained at a temperature of about 95° C. The gelled noodles were then conveyed in the water bath, maintained at about the same temperature, through a knife mill wherein they were ruptured by grinding. The ruptured noodles from the knife mill were removed from the stream of hot water and pressed at a temperature of about 85° C. in a hydraulic press until their water content was only about 67 percent by weight. They were then dried in a rotary steam tube drier being operated with a steam pressure of about 150 pounds per square inch (gage) to obtain a product with only about 1.2 percent by weight of moisture. The dried product was ground in two stages with an impact type grinder through subsequent 0.25 and 0.027 inch screens to obtain a powder having a bulk density of about 0.66 gram per cubic centimeter. Approximately 95 percent by weight of the powder had a particle size finer than about 42 mesh in the U. S. sieve series. The granular powder product dissolved readily in cold water.

By way of contrast with the foregoing, when the procedure was duplicated with the exception that a portion of the heat gelled material was permitted to cool to the syneresis point before being dried, the product was much more difficult to physically reduce and the resulting powder had a bulk density of only about 0.56 gram per cubic centimeter and had inferior cold-water-solubility characteristics.

Example 2

The procedure of the foregoing example was repeated in accordance with the invention with a methyl cellulose fibrous material having a viscosity rating of about 20 centipoises. It was admitted to the extruder as a 25 percent by weight slurry in water. Approximately 95 percent by weight of the powdered product passed a 42 mesh U. S. sieve series screen. Its bulk density was about 0.68 gram per cubic centimeter. As in Example 1, the granular powder prepared according to the invention had excellent direct solubility in cold water.

Example 3

A slurry of hydroxypropyl methyl cellulose in hot, 45° C. water containing about 10 percent by weight of the ether as a dispersed solid was admitted to an extruder similar to that employed in Example 1 and cooled therein to a temperature of about 20° C. It was extruded into ¼ inch rods at a rate of about 6 pounds per hour as a clear, completely dissolved, thick dough. The rods, upon extrusion, were chopped into lengths averaging between 1 and 2 inches before being dropped into a large volume of water at a temperature of about 95° C. After about 1–2 minutes, the chopped rods were completely gelled in the hot aqueous bath. They were passed in a current of the hot water through a steam heated knife grinder before being centifuged to about a 70 percent by weight water content in a steam heated basket-type centrifuge. The dewatered and ruptured rods were dried in a rotary steam tube drier while being maintained at a temperature above the syneresis point of the ether. The dried material, containing moisture in the amount of about 1.1 percent by weight, was readily comminuted in the manner set forth in the first example. The bulk density of the ground and dried powder was about 0.69 gram per cubic centimeter and about 95 percent of it by weight was finer than about 42 mesh in the U. S. sieve series. The granular powder product was quickly soluble in cold water.

As is apparent, the method of the present invention permits high quality, directly soluble forms of cellulose ethers to be prepared with simplified apparatus requirements and minimized power consumption. Furthermore, the method is especially well suited to being adapted according to continuous processing techniques and permits a closer control of the critical temperatures that are involved and a more efficient use of heat as compared with other processes that have been devised for a similar purpose. In addition, it is conveniently possible, according to the method of the invention, to make frequent changes in the type of product being manufactured with minimized risk of interproduct contamination and mixing.

What is claimed is:

1. Improved method for the preparation of granular forms of cellulose ethers having direct cold-water-solubility which comprises forming a viscous, aqueous solution of a cold-water-soluble hot-water-insoluble cellulose ether containing between about 2 and 35 percent by weight of the ether; gelling the solution in strandular form in a hot aqueous bath maintained at a temperature above the syneresis point of the ether; then, while said ether is being maintained at a temperature about 20 to 30 centigrade degrees above its syneresis point, sequentially mechanically rupturing the strandular surface of the gelled cellulose ether and mechanically dewatering and drying the ruptured strands; and finally comminuting the dried cellulose ether to a granular form.

2. In the method of claim 1, gelling the dissolved cellulose ether by extruding it in strandular form into the hot aqueous bath.

3. In the method of claim 1, heat-gelling the cellulose ether solution in a strandular form having a maximum cross-sectional dimension less than about 3/8 inches.

4. The method of claim 1 and including the steps of extruding the dissolved cellulose ether in strandular form and chopping the extruded strands into discontinuous, relatively short lengths prior to heat-gelling them in the hot aqueous bath.

5. In the method of claim 1, rupturing the strandular surface of the gelled cellulose ether while it is being conveyed in strandular form through rupturing means with at least a portion of hot aqueous bath in which it is gelled.

6. In the method of claim 1, dewatering the strandular gelled cellulose ether after it has been ruptured to a water content less than about 70 percent by weight prior to drying.

7. The method of claim 1 wherein the cellulose ether is methyl cellulose.

8. The method of claim 1 wherein the cellulose ether is hydroxypropyl methyl cellulose.

9. The method of claim 1 wherein the steps set forth are continuously and sequentially conducted in the manner of a continuous process.

References Cited in the file of this patent
UNITED STATES PATENTS

| | | |
|---|---|---|
| 2,331,865 | Swinehart et al. | Oct. 12, 1943 |
| 2,647,064 | Anderson et al. | July 28, 1953 |